United States Patent
Onoe et al.

(10) Patent No.: US 10,086,363 B2
(45) Date of Patent: *Oct. 2, 2018

(54) EXHAUST GAS PURIFICATION DEVICE (71) Applicant: CATALER CORPORATION, Kakegawa-shi, Shizuoka (JP)

(72) Inventors: Ryota Onoe, Kakegawa (JP); Yasutaka Nomura, Kakegawa (JP); Yuta Morishita, Kakegawa (JP); Junji Kuriyama, Kakegawa (JP); Hiroshi Sekine, Kakegawa (JP)

(73) Assignee: CATALER CORPORATION, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,635

(22) Filed: Oct. 5, 2016

(65) Prior Publication Data

US 2017/0095798 A1 Apr. 6, 2017

(30) Foreign Application Priority Data

Oct. 5, 2015 (JP) ................ 2015-197928

(51) Int. Cl.
*B01J 35/10* (2006.01)
*B01D 53/94* (2006.01)
(Continued)

(52) U.S. Cl.
CPC .......... *B01J 23/63* (2013.01); *B01D 46/2429* (2013.01); *B01D 53/94* (2013.01); *B01J 35/04* (2013.01); *B01J 35/1052* (2013.01); *F01N 3/035* (2013.01); *B01D 2046/2437* (2013.01); *B01D 2255/1021* (2013.01);
(Continued)

(58) Field of Classification Search
None
See application file for complete search history.

(56) References Cited

U.S. PATENT DOCUMENTS

| 2009/0087365 A1 | 4/2009 | Klingmann et al. |
| 2010/0184589 A1 | 7/2010 | Miyairi et al. |

(Continued)

FOREIGN PATENT DOCUMENTS

| DE | 10 2014 117 672 A1 | 6/2015 |
| GB | 2520776 A | 6/2015 |
| GB | 2524662 A | 9/2015 |
| JP | 2003-053117 A | 2/2003 |
| JP | 2007-185571 A | 7/2007 |
| JP | 2009-082915 A | 4/2009 |
| JP | 2009-160547 A | 7/2009 |
| JP | 2010-167366 A | 8/2010 |
| JP | 2010-172825 A | 8/2010 |
| JP | 2011-208526 A | 10/2011 |

(Continued)

*Primary Examiner* — Walter D. Griffin
*Assistant Examiner* — Jelitza M Perez
(74) *Attorney, Agent, or Firm* — Oliff PLC (57) ABSTRACT

The exhaust gas purification device includes: a substrate of wall flow structure having inlet cells, outlet cells and a porous partition wall; and a catalyst layer provided in at least part of internal pores of the partition wall and held on the surface of the internal pores. The relationship between an average filling factor A of the catalyst layer held in pores having a pore diameter of 5 μm to less than 10 μm, an average filling factor B of the catalyst layer held in pores having a pore diameter of 10 μm to less than 20 μm and an average filling factor C of the catalyst layer held in pores having a pore diameter of 20 μm to less than 30 μm, among the internal pores of the partition wall 16 in which the catalyst layer is held, satisfies the following expression: A<B<C.

10 Claims, 6 Drawing Sheets

(51) Int. Cl.
  *B01J 23/63*    (2006.01)
  *B01D 46/24*    (2006.01)
  *B01J 35/04*    (2006.01)
  *F01N 3/035*    (2006.01)
  *F01N 3/10*     (2006.01)
  *F01N 13/00*    (2010.01)

(52) U.S. Cl.
  CPC ........... *B01D 2255/1025* (2013.01); *B01D 2255/2065* (2013.01); *B01D 2255/2092* (2013.01); *B01D 2255/20715* (2013.01); *B01D 2255/407* (2013.01); *B01D 2255/915* (2013.01); *B01D 2255/9155* (2013.01); *B01D 2255/9202* (2013.01); *F01N 3/101* (2013.01); *F01N 13/0097* (2014.06); *F01N 2330/48* (2013.01); *Y02T 10/22* (2013.01)

(56) References Cited

U.S. PATENT DOCUMENTS

| | | |
|---|---|---|
| 2011/0305610 A1 | 12/2011 | Lambert et al. |
| 2015/0152768 A1* | 6/2015 | Arulraj ................ F01N 3/2828 428/117 |

FOREIGN PATENT DOCUMENTS

| | | |
|---|---|---|
| JP | 2011-218295 A | 11/2011 |
| JP | 2014-184422 A | 10/2014 |

* cited by examiner

EXHAUST GAS PURIFICATION DEVICE

CROSS-REFERENCE

The present international application claims priority based on Japanese Patent Application No. 2015-197928, filed on Oct. 5, 2015, the entire contents of which are incorporated in the present specification by reference.

BACKGROUND OF THE INVENTION

1. Field of the Invention

The present invention relates to an exhaust gas purification device, and more particularly to an exhaust gas purification device that purifies exhaust gas emitted from an internal combustion engine such as a gasoline engine.

2. Description of the Related Art

Generally, exhaust gas emitted from internal combustion engines contains, for instance, particulate matter (PM) having carbon as a main component, as well as ash made up of unburned components, and is known to give rise to air pollution. Regulations concerning emissions of particulate matter have become stricter year after year, alongside regulations on harmful components such as hydrocarbons (HC), carbon monoxide (CO), and nitrogen oxides ($NO_x$). Various technologies for trapping and removing particulate matter from exhaust gas have therefore been proposed.

For instance, particulate filters for trapping such particulate matter are provided in the exhaust passage of internal combustion engines. In gasoline engine, for instance, a certain amount of particulate matter, though smaller than that in diesel engines, is emitted together with the exhaust gas. A gasoline particulate filter (GPF) may accordingly be fitted in the exhaust passage. Such particulate filters include known filters, referred to as of wall flow-type, having a structure in which a substrate is configured out of multiple cells made up of a porous substance, and in which the inlets and the outlets of the multiple cells are plugged alternately (Japanese Patent Application Publication No. 2009-82915 and Japanese Patent Application Publication No. 2007-185571). In a wall flow-type particulate filter, exhaust gas that flows in through cell inlets passes through a demarcated porous cell partition wall, and is discharged out through the cell outlets. As the exhaust gas passes through the porous cell partition wall, the particulate matter is trapped within the pores inside the partition wall. Prior art relating to such filters include Japanese Patent Application Publication No. 2003-53117, Japanese Patent Application Publication No. 2009-160547, Japanese Patent Application Publication No. 2010-167366, Japanese Patent Application Publication No. 2010-172825, Japanese Patent Application Publication No. 2011-208526, Japanese Patent Application Publication No. 2014-184422 and Japanese Patent Application Publication No. 2003-53117.

SUMMARY OF THE INVENTION

Approaches involving supporting a noble metal catalyst on the above particulate filters have been studied in recent years with a view to further increasing exhaust gas purification performance. For instance, Japanese Patent Application Publication No. 2009-82915 discloses a filter catalyst in which a palladium layer as a noble metal catalyst is disposed inside a partition wall, and a rhodium layer is laid up outside (on the surface of) the partition wall. In such a technology, however, the flow path resistance of the exhaust gas increases, which translates into greater pressure loss, since the rhodium layer is formed outside the partition wall. Engine output may drop as a result. Japanese Patent Application Publication No. 2007-185571 discloses a filter catalyst in which a platinum layer and a rhodium layer, as noble metal catalysts, are separately supported in internal pores of a partition wall. However, simply arranging a catalyst layer of platinum and rhodium inside the pores of a partition wall, without addressing the details of the arrangement, translates into poor usage efficiency of platinum and rhodium, and proves insufficient in terms of achieving further improvements in purification performance described above.

The main object of the present invention, arrived at in the light of the above considerations, is to provide an exhaust gas purification device that is equipped with a filter catalyst of wall flow structure type and that allows realizing further improvements in purification performance.

As a result of diligent research aimed at attaining the above goal, the inventors found that purification performance on exhaust gas can be further enhanced, in an exhaust gas purification device provided with a filter catalyst of wall flow structure type in which a catalyst layer is formed in internal pores of a partition wall, by preferentially arranging the catalyst layer in large pores, having a relatively large pore diameter, among the internal pores of the partition wall, and perfected the present invention on the basis of that finding.

Specifically, the exhaust gas purification device according to the present invention is an exhaust gas purification device that is disposed in an exhaust passage of an internal combustion engine and purifies exhaust gas emitted from the internal combustion engine. The device has: a substrate of wall flow structure having inlet cells in which only an exhaust gas inflow end section is open, outlet cells which are adjacent to the inlet cells and in which only an exhaust gas outflow end section is open, and a porous partition wall that partitions the inlet cells and the outlet cells; and a catalyst layer provided in at least part of internal pores of the partition wall, and held on the surface of the internal pores. A relationship between an average filling factor A of the catalyst layer held in pores having a pore diameter of 5 μm to less than 10 μm, an average filling factor B of the catalyst layer held in pores having a pore diameter of 10 μm to less than 20 μm and an average filling factor C of the catalyst layer held in pores having a pore diameter of 20 μm to less than 30 μm, among the internal pores of the partition wall in which the catalyst layer is held, satisfies the following expression: A<B<C.

In an exhaust gas purification device having such a configuration, the average filling factor of the catalyst layer held in pores of relatively large pore diameter, among the internal pores of the partition wall, is larger than the average filling factor of the catalyst layer held in pores of relatively small pore diameter (A<B<C). In findings by the inventors, specifically, the exhaust gas flows more readily and the flow rate of exhaust gas is higher in large pores of relatively large pore diameter, as compared with small pores of relatively small pore diameter. The purification performance on exhaust gas can be effectively enhanced by arranging thus preferentially the catalyst layer in such large pores in which the flow rate of exhaust gas is high. Therefore, the present invention allows providing a high-performance exhaust gas purification device boasting purification performance superior to that of conventional art, despite the fact that the catalyst coating amount that is used in the filter as a whole is the same.

In a preferred aspect of the exhaust gas purification device disclosed herein, the average filling factor C of the catalyst layer held in the pores having a pore diameter of 20 μm to less than 30 μm is larger by 5% or more than the average filling factor B of the catalyst layer held in the pores having a pore diameter of 10 μm to less than 20 μm. The exhaust gas flowing through the pores in the partition wall can be purified efficiently by arranging thus a greater extent of catalyst layer in large pores having a pore diameter of 20 μm to less than 30 μm. The above-described effect (effect of enhancing exhaust gas purification performance) can be better brought out as a result.

In a preferred aspect of the exhaust gas purification device disclosed herein, the average filling factor B of the catalyst layer held in the pores having a pore diameter of 10 μm to less than 20 μm is larger by 5% or more than the average filling factor A of the catalyst layer held in the pores having a pore diameter of 5 μm to less than 10 μm. This allows the exhaust gas flowing through the internal pores of the partition wall to be purified yet more efficiently.

In a preferred aspect of the exhaust gas purification device disclosed herein, the average filling factor A is A≤70%, the average filling factor B is 45%<B≤90%, and the average filling factor C is 90%<C. An optimal exhaust gas purification device of further enhanced exhaust gas purification performance can be thus obtained by providing differences in the average filling factors within the above ranges, in accordance with respective pore diameter ranges.

In a preferred aspect of the exhaust gas purification device disclosed herein, an average filling factor D of the catalyst layer held in pores having a pore diameter of 30 μm or more, among the internal pores of the partition wall, is smaller than the average filling factor C of the catalyst layer held in the pores having a pore diameter of 20 μm to less than 30 μm. Preferably, the relationship between the average filling factor A, the average filling factor B, the average filling factor C and the average filling factor D satisfies the following expression: A<B<D<C. The above-described effect (the effect of enhancing exhaust gas purification performance) can be achieved, without incurring an excessive pressure loss, by prescribing thus the average filling factor D of the catalyst layer held in large pores having a pore diameter of 30 μm or more to be smaller than the average filling factor C of the catalyst layer held in the pores having a pore diameter of 20 μm to less than 30 μm.

In a preferred aspect of the exhaust gas purification device disclosed herein, a coating amount of the catalyst layer per L of volume of the substrate is less than 100 g/L. By virtue of the present constitution of the invention, the purification performance on exhaust gas can be effectively enhanced, while reducing the coating amount of the catalyst layer in the filter as a whole (and thus while reducing pressure loss and lowering costs), by prescribing the average filling factor of the catalyst layer held in large pores of large pore diameter to be larger than the average filling factor of the catalyst layer held in small pores of small pore diameter. Therefore, it becomes possible to realize a high-performance exhaust gas purification device that boasts excellent purification performance despite such small amount of catalyst layer, for instance less than 100 g/L per L of volume of substrate.

In a preferred aspect of the exhaust gas purification device disclosed herein, the internal combustion engine is a gasoline engine. The temperature of exhaust gas in gasoline engines is comparatively high, and PM does not deposit readily inside the partition wall. Accordingly, the above-described effect can be brought out more efficiently in a case where the internal combustion engine is a gasoline engine.

DETAILED DESCRIPTION OF THE INVENTION

Preferred embodiments of the present invention will be explained on the basis of drawings. Any features other than the features specifically set forth in the present description and which may be necessary for carrying out the present invention (for instance, general features pertaining to the arrangement of particulate filters in automobiles) can be regarded as instances of design matter for a person skilled in the art on the basis of known techniques in the technical field in question. The present invention can be realized on the basis of the disclosure of the present description and common technical knowledge in the relevant technical field.

Figure 1:
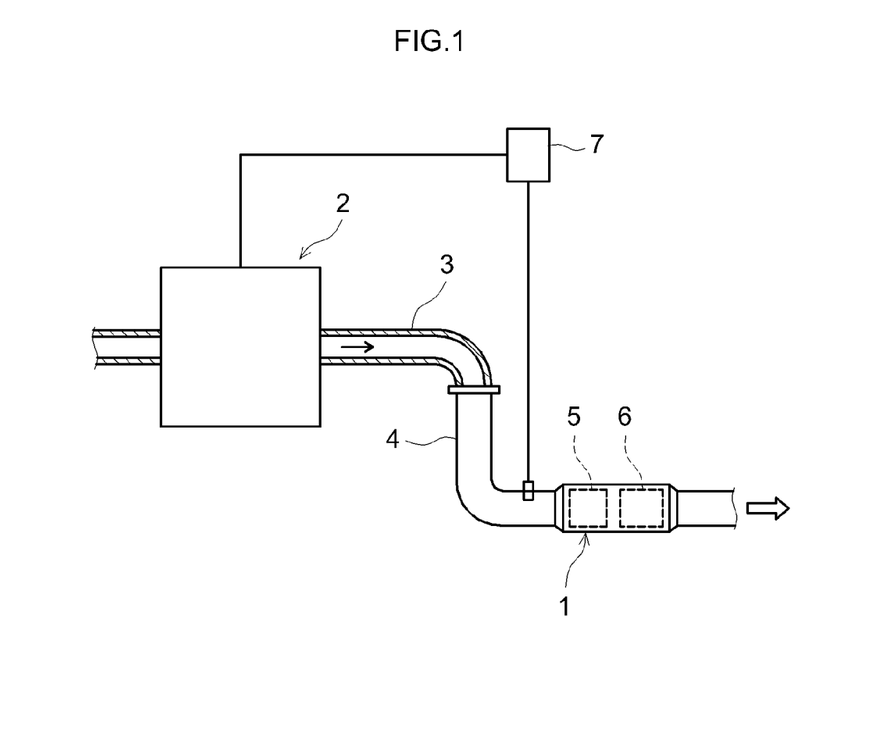
FIG. 1 is a diagram illustrating schematically an exhaust gas purification device according to an embodiment.

The configuration of an exhaust gas purification device according to an embodiment of the present invention will be explained first with reference to FIG. 1. An exhaust gas purification device 1 disclosed herein is provided in an exhaust system of the above internal combustion engine. FIG. 1 is a diagram illustrating schematically an internal combustion engine 2 and the exhaust gas purification device 1 that is provided in the exhaust system of the internal combustion engine 2.

An air-fuel mixture containing oxygen and fuel gas is supplied to the internal combustion engine (engine) according to the present embodiment. In the internal combustion engine the air-fuel mixture is burned, and the combustion energy is converted to mechanical energy. The burned air-fuel mixture becomes exhaust gas that is discharged to the exhaust system. The internal combustion engine 2 having the structure illustrated in FIG. 1 is configured mainly as a gasoline engine of an automobile.

The exhaust system of the engine 2 will be explained next. An exhaust manifold 3 is connected to an exhaust port (not shown) through which the engine 2 communicates with the exhaust system. The exhaust manifold 3 is connected to an exhaust pipe 4 through which exhaust gas flows. An exhaust passage of the present embodiment is formed by the exhaust manifold 3 and the exhaust pipe 4. The arrows in the figure denote the circulation direction of the exhaust gas.

The exhaust gas purification device 1 disclosed herein is provided in the exhaust system of the engine 2. The exhaust gas purification device 1, which is equipped with a catalyst unit 5, a filter unit 6 and an ECU 7, purifies harmful components (for instance, carbon monoxide (CO), hydrocarbons (HC) and nitrogen oxides ($NO_x$)) contained in the exhaust gas that is emitted, and traps particulate matter (PM) contained in the exhaust gas.

The catalyst unit 5 is configured to be capable of purifying three-way components ($NO_x$, HC and CO) contained in the exhaust gas, and is provided in the exhaust pipe 4 that communicates with the engine 2. Specifically, the catalyst unit 5 is provided downstream of the exhaust pipe 4, as illustrated in FIG. 1. The type of the catalyst unit 5 is not particularly limited. The catalyst unit 5 may be for instance a catalyst that supports a noble metal such as platinum (Pt), palladium (Pd), rhodium (Rd) or the like. A downstream catalyst unit may be further disposed in the exhaust pipe 4, downstream of the filter unit 6. The specific configuration of the catalyst unit 5 is not a characterizing feature of the present invention, and will not be explained in detail herein.

The filter unit 6 is provided downstream of the catalyst unit 5. The filter unit 6 has a gasoline particulate filter (GPF) capable of trapping and removing particulate matter (hereafter, "PM" for short) present in the exhaust gas. The particulate filter according to the present embodiment will be explained next in detail.

Figure 2:
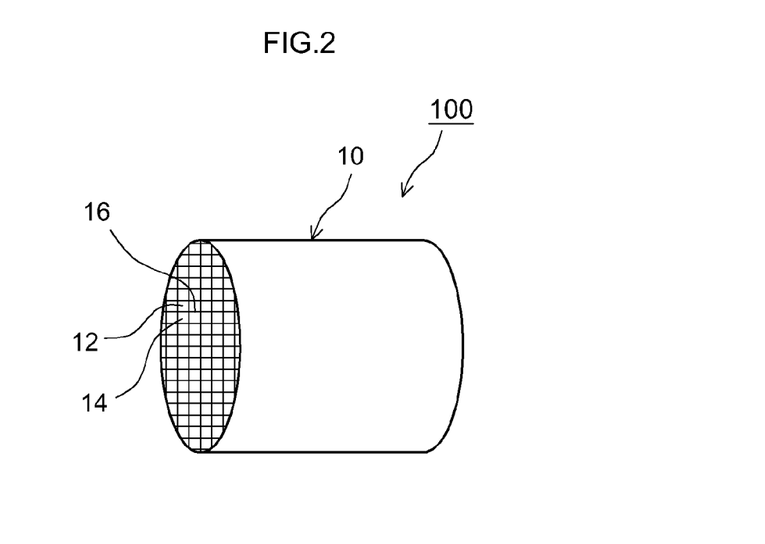
FIG. 2 is a perspective-view diagram illustrating schematically a filter of an exhaust gas purification device according to an embodiment.
Figure 3:
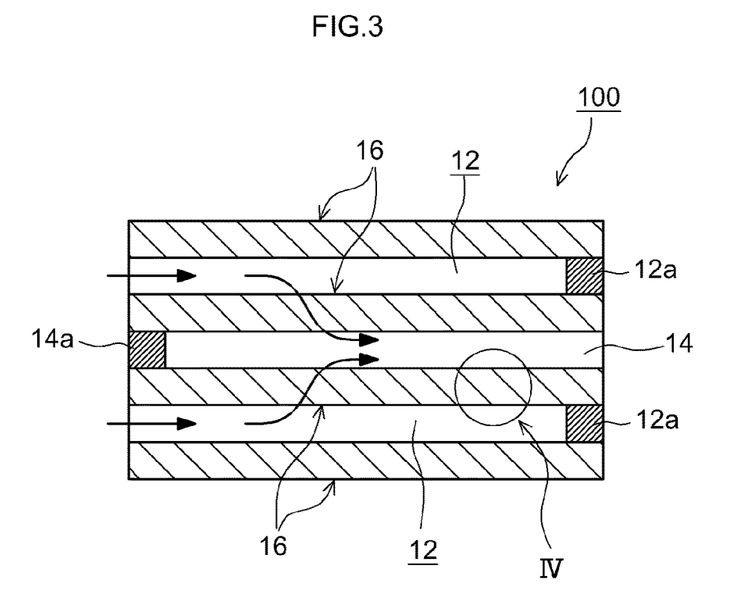
FIG. 3 is a cross-sectional diagram illustrating schematically a filter cross-section of an exhaust gas purification device according to an embodiment.
Figure 4:
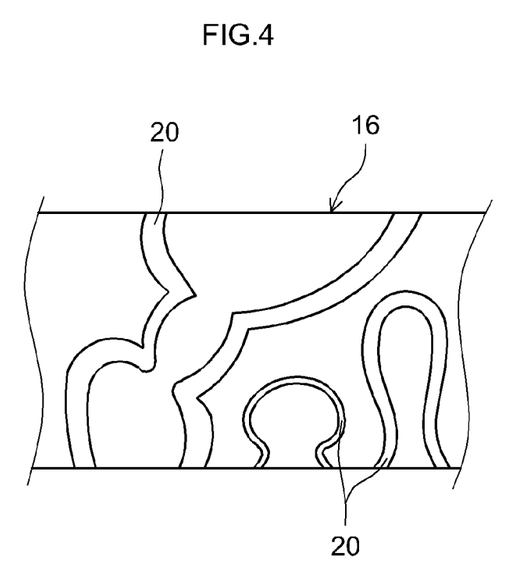
FIG. 4 is a cross-sectional schematic diagram of an enlargement of region IV in FIG. 3.

FIG. 2 is a perspective-view diagram of a particulate filter 100. FIG. 3 is a schematic diagram of an enlargement of part of a cross-section of the particulate filter 100, cut in the axial direction. As illustrated in FIG. 2 and FIG. 3, the particulate filter 100 is provided with a substrate 10 having a wall flow structure, and with a catalyst layer 20 (FIG. 4). The substrate 10 and the catalyst layer 20 will be explained next in this order.

(Substrate 10)

As the substrate 10 there can be used conventional substrates of various materials and forms that are used in this kind of applications. For instance, substrates formed out of a ceramic such as cordierite, silicon carbide (SiC) or the like, or out of an alloy (stainless steel or the like) can be suitably used herein. Illustrative examples include substrates having a cylindrical outer shape (the present embodiment). However, an elliptic cylinder shape or polygonal cylinder shape may be adopted, instead of a cylinder, as the outer shape of the substrate as a whole. The substrate 10 has inlet cells 12 in which only an exhaust gas inflow end section is open, outlet cells 14 which are adjacent to the inlet cells 12 and in which only an exhaust gas outflow end section is open, and a porous partition wall 16 that partitions the inlet cells 12 and the outlet cells 14.

(Inlet Cells 12 and Outlet Cells 14)

In the inlet cells 12 only the exhaust gas inflow end section is open. In the outlet cells 14, which are adjacent to the inlet cells 12, only the exhaust gas outflow end section is open. In this embodiment, the exhaust gas outflow end section of the inlet cells 12 is plugged by a sealing section 12a, and the exhaust gas inflow end section of the outlet cells 14 is plugged by a sealing section 14a. The inlet cells 12 and the outlet cells 14 may be set to have an appropriate shape and size taking into consideration the flow rate and components of the exhaust gas that is supplied to the filter 100. For instance, the inlet cells 12 and the outlet cells 14 may adopt various geometrical shapes, for instance, quadrangles such as parallelograms, rectangles and trapezoids, triangles and other polygons (for instance, hexagons, octagons), as well as circular shapes.

(Partition Wall 16)

The partition wall 16 is formed between the inlet cells 12 and the outlet cells 14 adjacent to each other. The inlet cells 12 and the outlet cells 14 are partitioned by the partition wall 16. The partition wall 16 has a porous structure that allows exhaust gas to pass therethrough. The porosity of the partition wall 16 is not particularly limited, but lies appropriately in the range of about 50% to 70%, preferably 55% to 65%. When the porosity of the partition wall 16 is excessively low, pressure loss increases, while when the porosity of the partition wall 16 is excessively high, the mechanical strength of the filter 100 tends to drop, both of which are undesirable. The above porosity of the partition wall 16 is preferable also from the viewpoint of causing a below-described high-viscosity slurry to be preferentially disposed in large pores of the partition wall 16. The average pore diameter of the partition wall 16 is not particularly limited, but is of about 5 μm to 30 μm, preferably 10 μm to 25 μm, for instance in terms of PM trapping efficiency and suppression of increases in pressure loss. Such average pore diameter of the partition wall 16 is preferable also from the viewpoint of causing the below-described high-viscosity slurry to be preferentially disposed in large pores of the partition wall 16. The thickness of the partition wall 16 is not particularly limited, but may be of about 0.2 mm to 1.6 mm. Within such a range of partition wall thickness it becomes possible to achieve the effect of suppressing increases in pressure loss, without compromising PM trapping efficiency. The above thickness of the partition wall 16 is preferable also from the viewpoint of causing the below-described high-viscosity slurry to be preferentially disposed in large pores of the partition wall 16.

(Catalyst Layer 20)

FIG. 4 is an enlarged schematic diagram of an enlargement of region IV in FIG. 3. As illustrated in FIG. 4, the catalyst layer 20 is provided inside the partition wall 16. In further detail, the catalyst layer 20 is held on the wall surface of internal pores of the partition wall 16.

In the particulate filter 100 disclosed herein, a relationship between an average filling factor A of the catalyst layer 20 held in pores having a pore diameter of 5 μm to less than 10 μm, an average filling factor B of the catalyst layer 20 held in pores having a pore diameter of 10 μm to less than 20 μm and an average filling factor C of the catalyst layer 20 held in pores having a pore diameter of 20 μm to less than 30 μm, among the internal pores of the partition wall 16, satisfies the following expression: A<B<C. The purification performance on exhaust gas can be efficiently enhanced by prescribing thus the average filling factor of the catalyst layer held in large pores of relatively large pore diameter to be larger than the average filling factor of the catalyst layer held in small pores of relatively small pore diameter.

Although there is no need to elucidate the reasons why such an effect is afforded when implementing the technology disclosed herein, it is deemed that the reasons include the following. In findings by the inventors, specifically, the flow path of exhaust gas is larger, and the flow rate thereof higher, in large pores of relatively large pore diameter, as compared with small pores of relatively small pore diameter. It is conjectured that by arranging preferentially the catalyst layer in large pores having a high exhaust gas flow rate it becomes possible to increase contact opportunities between the catalyst layer and the exhaust gas, as compared with conventional instances where both large pores and small pores are disposed uniformly in the catalyst layer. The exhaust gas purification performance can be effectively increased as a result. Therefore, the present configuration allows providing a high-performance exhaust gas purification device boasting purification performance superior to that of conventional art, despite the fact that the catalyst coating amount that is used in the filter as a whole is the same.

The average filling factor C of the catalyst layer held in the pores having a pore diameter of 20 μm to less than 30 μm is not particularly limited, so long as it is larger than the average filling factor B of the catalyst layer held in the pores having a pore diameter of 10 μm to less than 20 μm. For instance, the average filling factor C of the catalyst layer held in the pores having a pore diameter of 20 μm to less than 30 μm is preferably larger by 5% or more, more preferably larger by 10% or more, than the average filling factor B of the catalyst layer held in the pores having a pore diameter of 10 μm to less than 20 μm. The exhaust gas purification device disclosed herein can be preferably realized for instance in an implementation where the average filling factor C is larger by 12% or more than the average filling factor B. This allows achieving yet better exhaust gas purification performance. For instance, the average filling factor C may be 20% or more (for instance, 30% or more, typically 40% or more) larger than the average filling factor B. The value resulting from subtracting the average filling factor B from the average filling factor C (i.e. C−B) is preferably 60% or less, more preferably 55% or less, and yet more preferably 50% or less. For instance, C−B may be 25% or less, or may be 20% or less, or may be 15% or less. Concrete examples of the average filling factor C are preferably 80%≤C, more preferably 85%≤C, yet more preferably 90%≤C (for instance 90%<C), and particularly preferably 95%≤C, in terms for instance of better bringing about the effect elicited by setting the average filling factor C to be larger than the average filling factors A and B (effect of enhancing exhaust gas purification performance). The upper limit of the average filling factor C is not particularly limited, but is about C≤98%, preferably C≤96.5%, in terms for instance of suppressing increases in pressure loss.

The average filling factor B of the catalyst layer held in the pores having a pore diameter of 10 μm to less than 20 μm is not particularly limited, so long as it is larger than the average filling factor A of the catalyst layer held in the pores having a pore diameter of 5 μm to less than 10 μm. For instance, the average filling factor B of the catalyst layer held in the pores having a pore diameter of 10 μm to less than 20 μm is preferably larger by 5% or more, more preferably larger by 8% or more, than the average filling factor A of the catalyst layer held in the pores having a pore diameter of 5 μm to less than 10 μm. This allows achieving yet better exhaust gas purification performance. For instance, the average filling factor B may be larger by 10% or more, typically larger by 15% or more, than the average filling factor A. The exhaust gas purification device disclosed herein can be preferably realized for instance in an implementation where the average filling factor B is larger by 18% or more than the average filling factor A. The value resulting from subtracting the average filling factor A from the average filling factor B (i.e. B−A) is preferably 40% or less, more preferably 30% or less, and yet more preferably 25% or less. For instance, B−A may be 20% or less, typically 10% or less. Concrete examples of the average filling factor B are preferably 45%≤B, more preferably 50%≤B, for instance 65%≤B, and typically 70%≤B (for instance 70%<B), in terms for instance of better bringing about the effect elicited by setting the average filling factor B to be larger than the average filling factor A (for instance, effect of enhancing exhaust gas purification performance). The exhaust gas purification device disclosed herein can be realized for instance in an implementation where the average filling factor B is 75%≤B, typically 80%≤B. The upper limit of the average filling factor B is not particularly limited, but is about B≤90%, preferably B≤85%, in terms for instance of suppressing increases in pressure loss.

The average filling factor A of the catalyst layer held in the pores having a pore diameter of 5 μm to less than 10 μm is not particularly limited, so long as it satisfies the relationship A<B<C with respect to the average filling factors B and C, but is preferably 30%≤A, more preferably 40%≤A, for instance 45%≤A and typically 50%≤A, from the viewpoint of enhancing exhaust gas purification performance. The exhaust gas purification device disclosed herein can be realized for instance in an implementation where the average filling factor A is 55%≤A, typically 60%≤A. The upper limit of the average filling factor A is not particularly limited, but is about A≤80%, preferably A≤70% (for instance A<70%) in terms for instance of suppressing increases in pressure loss.

In one preferred aspect of the technology disclosed herein, an average filling factor D of the catalyst layer 20 held in pores having a pore diameter of 30 μm or more, among the internal pores in which there is held the catalyst layer 20 of the partition wall 16, is smaller than the average filling factor C of the catalyst layer held in the pores having a pore diameter of 20 μm to less than 30 μm. In one preferred aspect, the relationship between the average filling factor A, the average filling factor B, the average filling factor C and the average filling factor D satisfies the following expression: A<B<D<C. The above-described effect (for instance, the effect of enhancing exhaust gas purification performance) can be achieved, without incurring an excessive pressure loss, by prescribing thus the average filling factor D of the catalyst layer held in large pores having a pore diameter of 30 μm or more to be smaller than the average filling factor C of the catalyst layer held in the pores having a pore diameter of 20 μm to less than 30 μm. For instance, the average filling factor D of the catalyst layer 20 held in the pores having a pore diameter of 30 μm or more is preferably smaller by 5% or more, preferably smaller by 7% or more, than the average filling factor C of the catalyst layer held in the pores having a pore diameter of 20 μm to less than 30 μm. As a result it becomes possible to achieve both reduction of pressure loss and improvement of purification performance, to a yet higher degree. For instance, the average filling factor D may be smaller by 20% or more, or smaller by 30% or more, than the average filling factor C. The value resulting from subtracting the average filling factor D from the average filling factor C (i.e. C−D) is preferably 40% or less, more preferably 35% or less. Herein, C−D may be 20% or less, or 10% or less. A concrete example of the average filling factor D is preferably 55%≤D, more preferably 60%≤D, from the viewpoint of enhancing exhaust gas purification performance. The exhaust gas purification device disclosed herein can be realized for instance in an implementation where the average filling factor D is 78%≤D, typically 85%≤D. The upper limit of the average filling factor D is not particularly limited, but is about D≤93%, preferably D≤90%, in terms for instance of suppressing increases in pressure loss. For instance, there may hold D≤80%, typically D≤70%.

In the present description, the pore diameter of the pores provided inside the partition wall and the filling factor of the catalyst layer held in the pores are calculated as follows.

(1) Using a scanning electronic microscope (SEM) or transmission electronic microscope (TEM) there are observed internal pores, having a catalyst layer held therein, in a cross-sectional SEM image or cross-sectional TEM image of a partition wall. Isolation of the pores is initiated from the site, within the image, at which the largest pore diameter can be accommodated.

(2) In the case of connected pores, a given pore is demarcated at the site where the diameter has narrowed down to 50% of the largest pore diameter, and is isolated as one pore (the catalyst layer is processed herein as pores).

(3) The diameter of an ideal circle (true circle) having the same surface area as the surface area X of the pore calculated from the isolated pore image is calculated herein as the pore diameter of the pore.

(4) The surface area Y of the catalyst layer held in the pore is calculated from the isolated pore image, and the percentage of the value resulting from dividing the surface area Y of the catalyst layer by the surface area X of the pore (i.e. 100×Y/X) is calculated as the filling factor (%) of the catalyst layer.

(5) There is isolated the pore of next larger pore diameter to the pore having been isolated in (1) above.

Thereafter, the process from (2) to (5) is repeated until the pore diameter of the isolated pore is 5 μm or smaller, to work out as a result the pore diameter of the pores provided inside the partition wall, as well as the filling factor of the catalyst layer held in the pores. The average filling factor of the catalyst layer for each pore diameter range can be derived by working out the arithmetic average of the filling factors of the catalyst layer in each pore diameter range. The pore diameter of each pore and the filling factor of the catalyst layer can be worked out using image analysis software that is run in a computer that performs predetermined processing in accordance with a predetermined program.

(Coating Amount of the Catalyst Layer)

The coating amount of the catalyst layer is not particularly limited, so long as the average filling factors A, B and C of the catalyst layer held in the pores having the respective pore diameter ranges satisfy the above relationship A<B<C, but is about 140 g/L or less, preferably 120 g/L or less, more preferably less than 100 g/L, yet more preferably 80 g/L or less and particularly preferably 65 g/L or less, per L of volume of substrate. Thanks to the present configuration, the purification performance on exhaust gas can be effectively enhanced, while reducing the coating amount of the catalyst layer in the filter as a whole (and thus while reducing pressure loss and lowering costs), by prescribing the average filling factor of the catalyst layer held in large pores of large pore diameter to be larger than the average filling factor of the catalyst layer held in small pores of small pore diameter. Therefore, it becomes possible to realize a high-performance exhaust gas purification device (for instance in that there is no increase in pressure loss during passage of exhaust gas through the substrate) that boasts excellent purification performance despite such small amount of catalyst layer, for instance 140 g/L or less (preferably less than 100 g/L, and more preferably 65 g/L or less) per L of volume of substrate. The lower limit of the coating amount of the catalyst layer is not particularly limited, but is preferably 30 g/L or more, more preferably 40 g/L or more and yet more preferably 50 g/L or more in terms for instance of enhancing purification performance. The technology disclosed herein can be preferably realized in an implementation such that the coating amount of the catalyst layer per L of volume of substrate lies in the range of 60 g/L to 70 g/L.

In the present specification, the wording "catalyst layer held in the internal pores of the partition wall" signifies that the catalyst layer is present mainly not on the surface (i.e. exterior) of the partition wall, but inside the partition wall (wall surface of internal pores). More specifically, for instance the cross-section of the substrate is observed under an electronic microscope, and the total coating amount of the catalyst layer is set to 100%. In this case, the above wording signifies that the coating amount fraction that is present on the wall surface of the internal pores of the partition wall is typically 90% or more, for instance 95% or more, preferably 98% or more, and further 99% or more, and is in particular substantially 100% (i.e., there is substantially no catalyst layer on the surface of the partition wall). This is therefore clearly distinguished from an instance where, for instance, part of the catalyst layer, when the latter is arranged on the surface of the partition wall, penetrates unintentionally into the internal pores of the partition wall.

(Noble Metal)

The catalyst layer 20 contains a noble metal and a carrier that supports the noble metal. It suffices herein that the noble metal in the catalyst layer 20 has a catalytic function towards harmful components in the exhaust gas. Examples of noble metal that can be used include for instance palladium (Pd), rhodium (Rh), platinum (Pt), ruthenium (Ru), iridium (Ir), osmium (Os) and the like.

(Carrier)

The catalyst layer 20 is formed by supporting the noble metal on a carrier (typically in powder form). Examples of carriers that support the above noble metals include for instance metal oxides such as alumina ($Al_2O_3$), zirconia ($ZrO_2$), ceria ($CeO_2$), silica ($SiO_2$), magnesia (MgO) titanium oxide (titania: $TiO_2$), and solid solutions of the foregoing (for instance, a ceria-zirconia ($CeO_2$—$ZrO_2$) complex oxide). Among the foregoing there is preferably used alumina and/or a ceria-zirconia complex oxide. Two or more types of the foregoing may be used concomitantly. Other materials (typically inorganic oxides) may be added, as an auxiliary component, to the carrier. Rare earth elements such as lanthanum (La), yttrium (Y) or the like, alkaline earth elements such as calcium, as well as other transition metal elements can be used as substances that can be added to the carrier. Among the foregoing, rare earth elements such as lanthanum, yttrium or the like allow increasing the specific surface area at high temperature without impairing the catalytic function, and hence are suitably used as stabilizers.

The amount of noble metal supported on the carrier is not particularly limited, but it is appropriate to set the amount to lie in the range of 0.01 mass % to 2 mass % (for instance, 0.05 mass % to 1 mass %) with respect to the total mass of the carrier that supports the noble metal in the catalyst layer 20. The method for supporting the noble metal on the carrier of the catalyst layer 20 is not particularly limited. For instance, a noble metal-supporting carrier can be prepared by impregnating a carrier powder containing $Al_2O_3$ and/or a $CeO_2$—$ZrO_2$ complex oxide with an aqueous solution that contains a noble metal salt (for instance, a nitrate) or a noble metal complex (for instance, a tetraammine complex), followed by drying and firing.

Besides the noble metal and carrier, the catalyst layer 20 may contain a $NO_x$ absorbent material having $NO_x$ storage ability. It suffices herein that the $NO_x$ absorbent material has $NO_x$ storage ability of absorbing $NO_x$ in the exhaust gas in a state where the air-fuel ratio of the exhaust gas is lean, with oxygen excess, and releasing the absorbed $NO_x$ when the air-fuel ratio is switched to rich. A basic material containing one or two or more types of metal capable of donating electrons to $NO_x$ can be preferably used herein as such $NO_x$ absorbent material. Examples include for instance alkali metals such as potassium (K), sodium (Na) and cesium (Cs), alkaline-earth metals such as barium (Ba) and calcium (Ca), rare earths such as lanthanides, and metals such as silver (Ag), copper (Cu), iron (Fe), iridium (Ir) and the like. Among the foregoing, barium compounds (for instance, barium sulfate) have high $NO_x$ storage ability, and are therefore preferred as the $NO_x$ absorbent material that is used in the exhaust gas purification device disclosed herein.

The catalyst layer 20 may be configured out of an upstream catalyst layer disposed at an upstream portion of the substrate 10 in the exhaust gas circulation direction, including the exhaust gas inflow end section, and a downstream catalyst layer disposed at a downstream portion, in the exhaust gas circulation direction, including the exhaust gas outflow end section of the substrate 10. In this case, the upstream catalyst layer may be formed in a portion corresponding to up to 20% to 100% (for instance, 50% to 80%, i.e. ½ to ⅘ of the substrate as a whole) of the length of the substrate 10, from the exhaust gas inflow end section of the substrate 10 towards the downstream side. Further, the downstream catalyst layer may be formed in a portion corresponding to up to 20% to 100% (for instance, 50% to 80%, i.e. ½ to ⅘ of the substrate as a whole) of the length of the substrate 10, from the exhaust gas outflow end section of the substrate 10 towards the upstream side. In a case thus where the catalyst layer 20 is configured out of an upstream catalyst layer and a downstream catalyst layer, it suffices that the catalyst layer 20 held in the internal pores of the partition wall 16 satisfies the relationship of average filling factors A<B<C described above in a region (internal pores in which the catalyst layer 20 is held) in which the upstream catalyst layer and the downstream catalyst layer are formed in the substrate 10 (partition wall 16).

The upstream catalyst layer may be unevenly distributed within the partition wall 16 in such a manner that the upstream catalyst layer is in contact with the inlet cells 12 and not in contact with the outlet cells 14, in the thickness direction of the partition wall 16. For instance, the upstream catalyst layer may be formed in a portion corresponding to up to 30% to 100% of the thickness D of the partition wall 16 (for instance 30% to 70%, preferably 40% to 80% i.e. ⅖ to ⅘ of the thickness of the partition wall), from the surface of the partition wall 16 in contact with the inlet cells 12 towards the outlet cells 14, in the thickness direction of the partition wall 16. The downstream catalyst layer may be distributed unevenly within the partition wall 16, in such a manner that the downstream catalyst layer is in contact with the outlet cells 14 and not in contact with the inlet cells 12, in the thickness direction of the partition wall 16. For instance, the downstream catalyst layer may be formed in a portion corresponding to up to 30% to 100% of the thickness D of the partition wall 16 (for instance 30% to 70%, preferably 40% to 80% i.e. ⅖ to ⅘ of the thickness of the partition wall), from the surface of the partition wall 16 in contact with the outlet cells 14 towards the inlet cells 12, in the thickness direction of the partition wall 16. In a case thus where the catalyst layer 20 (upstream catalyst layer and downstream catalyst layer) is unevenly distributed within the partition wall 16, in the thickness direction, it suffices that the catalyst layer 20 held in the internal pores of the partition wall 16 satisfies the relationship of average filling factors A<B<C in a region of the partition wall 16 (internal pores in which the catalyst layer 20 is held) in which there is formed the catalyst layer 20 (upstream catalyst layer and downstream catalyst layer).

(Method for Forming the Catalyst Layer 20)

To form the catalyst layer 20, a slurry for catalyst layer formation may be prepared that contains a powder resulting from supporting a noble metal on a carrier, and an appropriate solvent (for instance deionized water).

The viscosity of the slurry is an important factor herein in terms of achieving the magnitude relationship (A<B<C) of the average filling factors of the catalyst layer. Specifically, the viscosity of the slurry may be adjusted as appropriate in such a manner that the slurry flows readily into large pores (for instance, pores having a pore diameter of 20 μm to less than 30 μm) but does not flow readily into small pores (for instance pores having a pore diameter of 5 μm to less than 10 μm), among the internal pores of the partition wall 16. Preferably, the viscosity of the slurry at a shear rate of 4 $s^{-1}$ can be 500 mPa·s or higher (for instance, 500 mPa·s to 8000 mPa·s), preferably 1000 mPa·s or higher, more preferably 1500 mPa·s or higher, yet more preferably 2000 mPa·s or higher and particularly preferably 2500 mPa·s or higher (for instance, 2500 mPa·s to 5000 mPa·s). By using such a high-viscosity slurry, the latter becomes preferentially disposed in large pores among the internal pores of the partition wall 16, and a catalyst layer can be formed that satisfies the magnitude relationship (A<B<C) of the average filling factors. A thickener or dispersant may be incorporated into the slurry in order to realize such slurry viscosity. Examples of the thickener include cellulosic polymers such as carboxymethyl cellulose (CMC), methyl cellulose (MC), hydroxypropylmethyl cellulose (HPMC), hydroxyethyl methyl cellulose (HEMC) and the like. The content of the thickener in the total solids of the slurry is not particularly limited so long as the viscosity of the slurry satisfies the above ranges, and is about 0.5 mass % to 10 mass %, preferably 1 mass % to 5 mass %, and more preferably 1.1 mass % to 3 mass %. The slurry viscosity can be measured using a commercially available shear viscometer at normal temperature. For instance, the viscosity can be measured easily within such a shear rate range by using a standard dynamic viscoelasticity measuring device (rheometer) in the technical field in question. Herein, the term "normal temperature" denotes a temperature range of 15° C. to 35° C., typically a temperature range of 20 to 30° C. (for instance, 25° C.).

A further example of a suitable condition for achieving the magnitude relationship (A<B<C) of the average filling factors of the catalyst layer disclosed herein involves setting the average particle size of the particles (typically, the carrier powder on which the noble metal is supported) in the slurry to be about 1/50 to 1/3 of the average pore diameter (median value: D50 diameter) of the partition wall 16. The average particle size of the particles in the slurry is more preferably about 1/40 to 1/5, and yet more preferably about 1/30 to 1/10, of the average pore diameter of the partition wall 16. In a case where for instance the average pore diameter of the partition wall 16 is 15 μm to 20 μm, the average particle size of the particles in the slurry can be set to 0.3 μm to 3 μm (preferably 0.4 μm to 1 μm, more preferably 0.5 μm to 0.7 μm). Within such a range of average particle size of the particles in the slurry, the latter becomes readily disposed preferentially in large pores among the internal pores of the partition wall 16. It becomes as a result possible to form more stably a catalyst layer that satisfies the above magnitude relationship (A<B<C) of average filling factors. The average particle size (median value: D50 diameter) of the particles in the slurry can be grasped on the basis of a laser diffraction-scattering methods.

To form the catalyst layer 20, the slurry is applied onto the portion of the substrate 10 (FIG. 2) constituting the exhaust gas inflow end section, and is suctioned from the other end portion (i.e. the portion of the substrate 10 constituting the exhaust gas outflow end section). As a result of such suction, the slurry is caused to flow into the pores of the partition wall 16 from the surface of the partition wall 16 in contact with the inlet cells 12 (FIG. 3) towards the outlet cells 14 (FIG. 3). Further, the slurry is applied onto the portion of the substrate 10 constituting the exhaust gas outflow end section, and is suctioned from the other end portion (i.e. the portion of the substrate 10 constituting the exhaust gas inflow end section). As a result of such suction, the slurry is caused to flow into the pores of the partition wall 16 from the surface of the partition wall 16 in contact with the outlet cells 14 (FIG. 3) towards the inlet cells 12 (FIG. 3). Once the slurry has been caused to flow into the pores of the partition wall 16, the slurry may then be dried and fired. The catalyst layer 20 becomes held as a result on the wall surface of the pores of the partition wall 16.

The suction speed (wind speed) of the slurry varies depending for instance on the cross-sectional diameter of the substrate; as an example, however, the suction speed is appropriately set to lie in the range of about 10 m/s to 80 m/s in a case where the cross-sectional diameter (diameter) of the substrate is 80 mm to 250 mm (typically 100 mm to 160 mm). The suction time of the slurry is not particularly limited, but is appropriately set to lie in the range of about 1 second to 120 seconds. Suitable examples of the technology disclosed herein include an instance where the suction speed of the slurry is 10 m/s to less than 30 m/s and the suction time of the slurry is 120 seconds or longer; an instance where the suction speed of the slurry is 30 m/s to less than 50 m/s and the suction time of the slurry is 30 seconds or longer, and an instance where the suction speed of the slurry is 50 m/s to 80 m/s and the suction time of the slurry is 1 second or longer. Within such ranges of suction speed and suction time of the slurry, the latter becomes preferentially disposed in large pores among the internal pores of the partition wall 16, and a catalyst layer that satisfies the above magnitude relationship (A<B<C) of average filling factors can be formed yet more stably. The suction conditions of the slurry can be modified as appropriate in accordance with the cross-sectional diameter of the substrate and the moisture content of the slurry.

In a case where the slurry is applied to the portion of the substrate 10 constituting the exhaust gas inflow end section and is suctioned from the other end portion (i.e. the portion of the substrate 10 constituting the exhaust gas outflow end section), the slurry is preferably suctioned in such a manner that the latter coats a portion (coats the interior of the pores in that portion) corresponding to up to at least 30% (for instance 30% to 100%, preferably 60% to 80%) of the thickness of the partition wall 16, from the surface of the partition wall 16 in contact with the inlet cells 12 towards the outlet cells 14. In a case where the slurry is applied to the portion of the substrate 10 constituting the exhaust gas outflow end section and is suctioned from the other end portion (i.e. the portion of the substrate 10 constituting the exhaust gas inflow end section), the slurry is preferably suctioned in such a manner that the latter coats a portion (coats the interior of the pores in that portion) corresponding to up to at least 30% (for instance 30% to 100%, preferably 60% to 80%) of the thickness of the partition wall 16, from the surface of the partition wall 16 in contact with the outlet cells 14 towards the inlet cells 12. A catalyst layer that satisfies the magnitude relationship (A<B<C) of average filling factors can be formed more stably by causing thus to overlap, in the thickness direction of the partition wall 16, the coated region of slurry applied to the portion of the substrate 10 constituting the exhaust gas inflow end section, and the coated region of slurry applied to the portion of the substrate 10 constituting the exhaust gas outflow end section.

Further, the technology disclosed herein provides also a method for producing a particulate filter provided with a catalyst layer that satisfies the above magnitude relationship (A<B<C) of average filling factors.

This production method includes the steps of: preparing (procuring, producing or the like) a substrate of wall flow structure having inlet cells in which only an exhaust gas inflow end section is open, outlet cells which are adjacent to the inlet cells and in which only an exhaust gas outflow end section is open, and a porous partition wall that partitions the inlet cells and the outlet cells;

applying a slurry for catalyst layer formation onto a portion of the substrate constituting the exhaust gas inflow end section, and suctioning the slurry for catalyst layer formation from the other end portion (i.e. the portion of the substrate constituting the exhaust gas outflow end section), and applying a slurry for catalyst layer formation onto a portion of the substrate constituting the exhaust gas outflow end section, and suctioning the slurry from the other end portion (i.e. the portion of the substrate constituting the exhaust gas inflow end section); and drying and firing the substrate into which the slurry has been suctioned.

The slurry for catalyst layer formation is set so that the viscosity of the slurry at a shear rate of 4 s$^{-1}$ is 500 mPa·s to 8000 mPa·s. A filter produced in accordance with such a method can be suitably used as a particulate filter in an exhaust gas purification device.

In this particulate filter 100, exhaust gas flows in through the inlet cells 12 of the substrate 10, as illustrated in FIG. 3. The exhaust gas having flowed in through the inlet cells 12 passes through the porous partition wall 16 and reaches the outlet cells 14. The arrows in FIG. 3 denote the route along which the exhaust gas that flows in through the inlet cells 12 reaches the outlet cells 14 by traversing the partition wall 16. The partition wall 16 has a porous structure; as the exhaust gas passes through the latter, therefore, the particulate matter (PM) becomes trapped at the surface of the partition wall 16 and in the pores inside the partition wall 16. As illustrated in FIG. 4, the catalyst layer 20 is provided in the pores of the partition wall 16, and hence harmful components in the exhaust gas are purified as the exhaust gas passes through the interior of the pores of the partition wall 16. Herein the exhaust gas is efficiently purified in the catalyst layer 20 that is preferentially held in large pores having a high exhaust gas flow rate. The exhaust gas that reaches the outlet cells 14 after having passed through the partition wall 16 is then discharged out of the filter 100 through the opening on the exhaust gas outflow side.

Test examples pertaining to the present invention will be explained next, but the invention is not meant to be limited by the test examples illustrated below.

Example 1

Alumina as a carrier was prepared and was impregnated with a solution of Rh nitrate as a noble metal catalyst solution; thereafter, the solution was evaporated to dryness, to prepare thereby an Rh/alumina carrier powder having Rh supported thereon. A ceria-zirconia complex oxide as a carrier was prepared and was impregnated with a solution of Pt nitrate, as a noble metal catalyst solution; thereafter, the solution was evaporated to dryness, to prepare thereby a Pt/ceria-zirconia complex oxide carrier powder having Pt supported thereon. A slurry for catalyst layer formation was then prepared by mixing 35 parts by mass of the Rh/alumina carrier powder, 30 parts by mass of the Pt/ceria-zirconia complex oxide carrier powder, 1 part by mass of CMC as a thickener, and 100 parts by mass of deionized water. The viscosity of the slurry at a shear rate of 4 s$^{-1}$ was 2500 mPa·s, and the average particle size of the particles in the slurry was 0.7 μm. Next, the slurry was applied onto a portion of a cordierite substrate 10 (wall flow-type substrate illustrated in FIG. 2 and FIG. 3: diameter 103 mm, total length 100 mm, average pore diameter 17 μm) constituting the exhaust gas inflow end section, and was suctioned from the other end portion (i.e. the portion of the substrate 10 constituting the exhaust gas outflow end section), to cause as a result the slurry to flow into the pores of the partition wall 16. The suction conditions were set in such a manner that the slurry coated the portion (the interior of the pores in that portion) corresponding to up to 70% of the thickness of the partition wall 16, from the surface at which the partition wall 16 is in contact with the inlet cells 12 towards the outlet cells 14. Similarly, the slurry was applied onto the portion of the substrate 10 constituting the exhaust gas outflow end section, and was suctioned from the other end portion (i.e. the portion of the substrate 10 constituting the exhaust gas inflow end section), to cause as a result the slurry to flow into the pores of the partition wall 16. The suction conditions were set in such a manner that the slurry coated the portion (the interior of the pores in that portion) corresponding to up to 70% of the thickness of the partition wall 16, from the surface at which the partition wall 16 was in contact with the outlet cells 14 towards the inlet cells 12. This was followed by drying and firing, to form as a result the catalyst layer 20 inside the pores of the partition wall 16. The suction speed was set to 60 m/s and the suction time to 10 seconds. The coating amount of the catalyst layer per L of volume of the substrate was set to 100 g/L. A particulate filter provided with the catalyst layer 20 was obtained as a result of the above procedure.

Example 2

In the present example, a particulate filter was produced in accordance with the same procedure as in Example 1, except by setting herein to 65 g/L the coating amount of catalyst layer per L of volume of the substrate.

Comparative Example 1

In the present example the viscosity at a shear rate of 4 s$^{-1}$ of the slurry for catalyst layer formation was changed to 10 mPa·s through modification of the amounts of thickener and deionized water that were used. Further, the cordierite substrate was immersed in the above slurry to elicit inflow of the slurry into the partition wall, followed by drying and firing, to form as a result the catalyst layer 20 in the internal pores, over the entire area of the partition wall 16. Except for that, a particulate filter was produced in accordance with the same procedure as in Example 1.

Comparative Example 2

Figure 5:
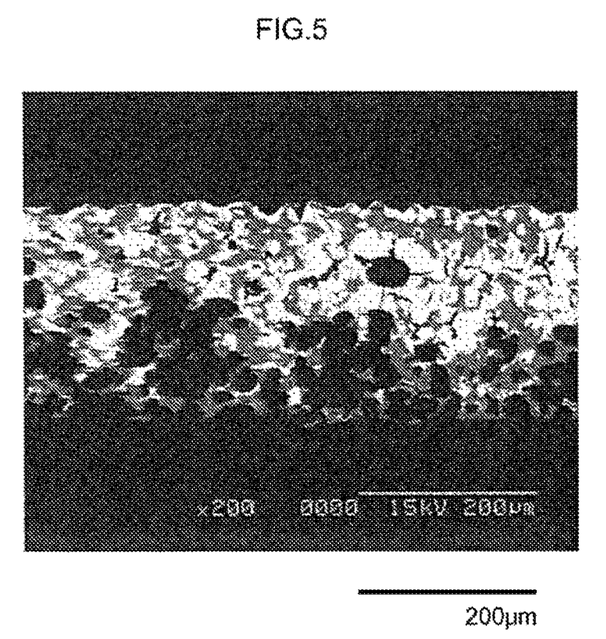
FIG. 5 is a cross-sectional SEM image of a partition wall in Example 1.
Figure 6:
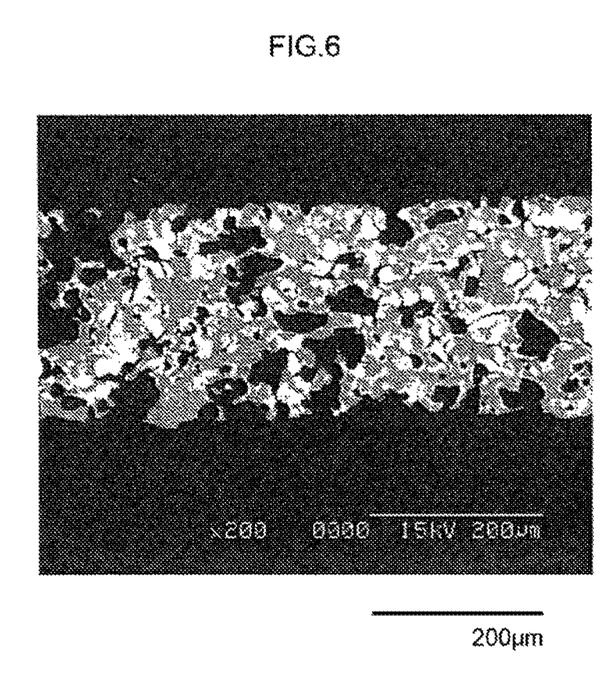
FIG. 6 is a cross-sectional SEM image of a partition wall in Comparative example 1.

In the present example a particulate filter was produced in accordance with the same procedure as in Comparative example 1, except by setting herein to 65 g/L the coating amount of catalyst layer per L of volume of the substrate.
(Average Filling Factor)
Cross-sectional SEM images of the partition wall of the particulate filters of the examples were captured, and there were measured the pore diameter of the internal pores of the partition wall in which the catalyst layer was held, as well as the filling factor of the catalyst layer held in the pores. The arithmetic average of the filling factors of the catalyst layer for each pore diameter range was worked out, to derive thereby the average filling factor A of the catalyst layer held in the pores having a pore diameter of 5 μm to less than 10 μm, the average filling factor B of the catalyst layer held in the pores having a pore diameter of 10 μm to less than 20 μm, the average filling factor C of the catalyst layer held in the pores having a pore diameter of 20 μm to less than 30 μm and the average filling factor D of the catalyst layer held in the pores having a pore diameter of 30 μm or more. In Examples 1 and 2 there were calculated the pore diameter of the pores in which the catalyst layer was held, and the average filling factor of the catalyst layer, in a portion corresponding to up to 50% of the thickness of the partition wall 16, from the surface of the partition wall 16 in contact with the inlet cells 12 towards the outlet cells 14. The results are given in Table 1. FIG. 5 illustrates a cross-sectional SEM image of the partition wall in Example 1, and FIG. 6 illustrates a cross-sectional SEM image of the partition wall in Comparative example 1.

TABLE 1

|  | Average filling Factor A (%) 5-10 μm | Average filling factor B (%) 10-20 μm | Average filling factor C (%) 20-30 μm | Average filling factor D (%) 30 μm or more |
|---|---|---|---|---|
| Example 1 | 65.3 | 84.1 | 96.4 | 88.6 |
| Example 2 | 40.1 | 48.7 | 92.8 | 62.2 |
| Comp. ex. 1 | 93.4 | 63.9 | 53.1 | 28.6 |
| Comp. ex. 2 | 79.9 | 50.5 | 26.6 | 14.5 |

Figure 7:
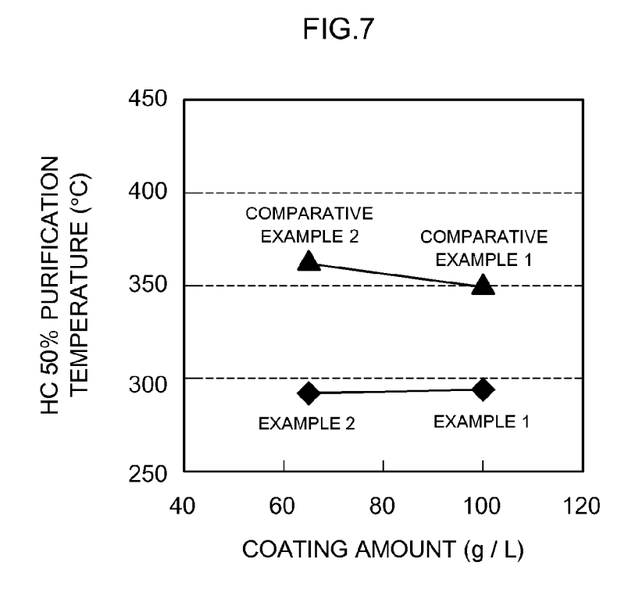
FIG. 7 is a graph illustrating the relationship between the coating amount of a catalyst layer and 50% purification temperature.

As Table 1 and FIG. 5 illustrate, it was found that in the particulate filters of Examples 1 and 2 the relationship between the average filling factor A of the catalyst layer held in the pores having a pore diameter of 5 μm to less than 10 μm, the average filling factor B of the catalyst layer held in the pores having a pore diameter of 10 μm to less than 20 μm and the average filling factor C of the catalyst layer held in the pores having a pore diameter of 20 μm to less than 30 μm, obeyed A<B<C, and that the catalyst layer was preferentially formed in pores of large pore diameter among the internal pores of the partition wall. On the other hand, as Table 1 and FIG. 6 reveal, it was found that in the particulate filters of Comparative examples 1 and 2 the relationship between the average filling factor A of the catalyst layer held in the pores having a pore diameter of 5 μm to less than 10 μm, the average filling factor B of the catalyst layer held in the pores having a pore diameter of 10 μm to less than 20 μm and the average filling factor C of the catalyst layer held in the pores having a pore diameter of 20 μm to less than 30 μm, obeyed A>B>C, and the catalyst layer was distributed uniformly irrespective of the pore diameter of the internal pores of the partition wall.
(50% Purification Temperature)
In each particulate filter of the examples there was measured continuously the purification rate of HC gas during a rise in temperature from 150° C. (rate of temperature rise 50° C./minute), to measure a 50% purification temperature. The 50% purification temperature denotes herein the gas temperature at the catalyst inlet at the time where the purification rate of HC gas reaches 50%. The results are given in Table 2 and FIG. 7. FIG. 7 is a graph illustrating the relationship between the coating amount of the catalyst layer and the 50% purification temperature.

TABLE 2

|  | Coating amount (g/L) | 50% purification temperature (° C.) |
|---|---|---|
| Example 1 | 100 | 294 |
| Example 2 | 65 | 292.1 |
| Comp. ex. 1 | 100 | 349.2 |
| Comp. ex. 2 | 65 | 361.9 |

As Table 1, Table 2 and FIG. 7 reveal, the HC purification temperature exceeded 340° C. in all the particulate filters of Comparative examples 1 and 2, where the relationship between the average filling factor A of the catalyst layer held in the pores having a pore diameter of 5 µm to less than 10 µm, the average filling factor B of the catalyst layer held in the pores having a pore diameter of 10 µm to less than 20 µm and the average filling factor C of the catalyst layer held in the pores having a pore diameter of 20 µm to less than 30 µm was set to obey A>B>C. By contrast, the HC purification temperature was lower than 300° C. and HC purification performance excellent in all the particulate filters of Examples 1 and 2, where the relationship between the average filling factor A of the catalyst layer held in the pores having a pore diameter of 5 µm to less than 10 µm, the average filling factor B of the catalyst layer held in the pores having a pore diameter of 10 µm to less than 20 µm and the average filling factor C of the catalyst layer held in the pores having a pore diameter of 20 µm to less than 30 µm was set to obey A<B<C. The 50% purification temperature in Comparative example 2, where the coating amount of the catalyst layer had been reduced, was higher than that of Comparative example 1, whereas Example 2, in which the coating amount of catalyst layer had been likewise reduced, tended by contrast to exhibit a drop in 50% purification temperature as compared with Example 1. It is deemed that the poorer purification performance in the comparative examples arises from the fact that, due to the reduction in the coating amount of the catalyst layer, the latter becomes preferentially accommodated within small pores into which the exhaust gas does not flow readily. In the examples, on the other hand, performance is deemed to be little affected by changes (increase and decrease) in the coating amount, since the catalyst layer is disposed at positions to which the exhaust gas flows readily. In other words, it is found that the configuration of the present embodiment has high technical value in allowing the purification performance on exhaust gas to be effectively enhanced while reducing the coating amount of the catalyst layer in the filter as a whole (and hence while reducing pressure loss and lowering costs).

Several variations of the particulate filter 100 and of the exhaust gas purification device 1 provided with the particulate filter 100 have been illustrated above, but the structure of the particulate filter 100 and of the exhaust gas purification device 1 is not limited to any one of the embodiments described above.

For instance, the shape and structure of the various members and sites of the exhaust gas purification device 1 may be modified. In the example illustrated in FIG. 1 the catalyst unit is provided upstream of the filter unit, but the catalyst unit may be omitted. The exhaust gas purification device 1 is particularly suitable as a device for purifying harmful components in exhaust gas having a comparatively high exhaust temperature, for instance in gasoline engines. However, the exhaust gas purification device 1 according to the present invention is not limited to being used to purify harmful components in exhaust gas of gasoline engines, and can be used in various applications that involve purifying harmful components in exhaust gas emitted from other engines (for instance, diesel engines).

What is claimed is:

1. An exhaust gas purification device adapted for placement in an exhaust passage of an internal combustion engine and purifies exhaust gas emitted from the internal combustion engine, the exhaust gas purification device comprising:
 a substrate of wall flow structure having inlet cells in which only an exhaust gas inflow end section is open, outlet cells which are adjacent to the inlet cells and in which only an exhaust gas outflow end section is open, and a porous partition wall that partitions the inlet cells and the outlet cells; and
 a catalyst layer provided in at least part of internal pores of the partition wall, and held on the surface of the internal pores,
 wherein a relationship between an average filling factor A of the catalyst layer held in pores having a pore diameter of 5 µm to less than 10 µm, an average filling factor B of the catalyst layer held in pores having a pore diameter of 10 µm to less than 20 µm, an average filling factor C of the catalyst layer held in pores having a pore diameter of 20 µm to less than 30 µm and an average filling factor D of the catalyst layer held in pores having a pore diameter of 30 µm or more, among the internal pores of the partition wall in which the catalyst layer is held, satisfies the following expression: A<B<D<C.

2. The exhaust gas purification device according to claim 1, wherein the average filling factor C is larger by 5% or more than the average filling factor B.

3. The exhaust gas purification device according to claim 1, wherein the average filling factor B is larger by 5% or more than the average filling factor A.

4. The exhaust gas purification device according to claim 1, wherein the average filling factor A is A≤70%,
 the average filling factor B is 45%<B≤90%, and
 the average filling factor C is 90%<C.

5. The exhaust gas purification device according to claim 1, wherein a coating amount of the catalyst layer per L of volume of the substrate is less than 100 g/L.

6. The exhaust gas purification device according to claim 1, wherein the internal combustion engine is a gasoline engine.

7. The exhaust gas purification device according to claim 1, wherein the average filling factor D is smaller by 5% or more than the average filling factor C.

8. The exhaust gas purification device according to claim 1, wherein the average filling factor D is 55% D.

9. The exhaust gas purification device according to claim 1, wherein a coating amount of the catalyst layer per L of volume of the substrate is 80 g/L or less.

10. The exhaust gas purification device according to claim 1, wherein a coating amount of the catalyst layer per L of volume of the substrate is 65 g/L or less.

* * * * *